United States Patent
Takaichi et al.

(10) Patent No.: US 9,190,683 B2
(45) Date of Patent: Nov. 17, 2015

(54) FUEL CELL SYSTEM

(75) Inventors: Satoshi Takaichi, Yokohama (JP); Shinichi Makino, Yokosuka (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 13/821,457

(22) PCT Filed: Oct. 7, 2011

(86) PCT No.: PCT/JP2011/073243
§ 371 (c)(1),
(2), (4) Date: Mar. 7, 2013

(87) PCT Pub. No.: WO2012/056866
PCT Pub. Date: May 3, 2012

(65) Prior Publication Data
US 2013/0164645 A1   Jun. 27, 2013

(30) Foreign Application Priority Data

Oct. 25, 2010   (JP) ................ 2010-238240
Sep. 1, 2011    (JP) ................ 2011-190503

(51) Int. Cl.
  *H01M 8/04*   (2006.01)
  *H01M 8/02*   (2006.01)
  *H01M 8/10*   (2006.01)

(52) U.S. Cl.
  CPC ...... *H01M 8/04679* (2013.01); *H01M 8/04261* (2013.01); *H01M 8/04552* (2013.01); *H01M 8/04671* (2013.01); *H01M 8/04955* (2013.01); *H01M 8/0241* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 6,815,107 B2 | 11/2004 | Inai et al. | |
| 7,166,929 B2 | 1/2007 | Saito et al. | |
| 2004/0101724 A1* | 5/2004 | Imamura et al. | 429/22 |
| 2004/0106025 A1* | 6/2004 | Saito et al. | 429/23 |

(Continued)

FOREIGN PATENT DOCUMENTS

| | | |
|---|---|---|
| CN | 1503391 A | 6/2004 |
| JP | 2003-45466 A | 2/2003 |

(Continued)

OTHER PUBLICATIONS

European Search Report, Mar. 5, 2014, 5 pages.
Chinese Office Action, Nov. 4, 2014, 6 pages.

*Primary Examiner* — Patrick Ryan
*Assistant Examiner* — Jose Colucci Rios
(74) *Attorney, Agent, or Firm* — Foley & Lardner LLP

(57) ABSTRACT

A fuel cell system (1) of the present invention includes a fuel cell stack (10) including plural single fuel cells (11) stacked on each other, each single fuel cell being supplied with hydrogen gas and air to an anode electrode (14) and a cathode electrode (13), respectively, to generate electricity. The system (1) further includes a voltage applying device (C9) that applies voltage to the fuel cell stack (10) after oxygen present in the cathode electrode (13) is reduced. The system (1) further includes a cross-leakage diagnosis device (C12) that diagnoses, based on voltage of the single fuel cells (11) when the voltage applying device (C9) applies the voltage to the fuel cell stack (10), whether hydrogen gas in the anode electrode (13) is cross-leaked to the cathode electrode (14) in each single fuel cell (11).

12 Claims, 5 Drawing Sheets

(56) References Cited

U.S. PATENT DOCUMENTS

2004/0124843 A1* 7/2004 Hamada et al. ............... 324/434
2006/0035118 A1 2/2006 Coerlin et al.
2006/0210850 A1* 9/2006 Abouatallah et al. ........... 429/22
2008/0038602 A1* 2/2008 Yu et al. ......................... 429/22
2008/0145716 A1* 6/2008 Yu et al. ......................... 429/13
2010/0248060 A1* 9/2010 Bono ............................. 429/443

FOREIGN PATENT DOCUMENTS

| | | |
|---|---|---|
| JP | 2006-114440 A | 4/2006 |
| JP | 2009-170388 A | 7/2009 |
| JP | 2009-181715 A | 8/2009 |
| JP | 2010-108815 A | 5/2010 |
| WO | WO 2006/096956 A1 | 9/2006 |

* cited by examiner

FUEL CELL SYSTEM

FIELD OF INVENTION

The present invention relates to a fuel cell system including a polymer electrolyte fuel cell, for example. Specifically, the present invention relates to a fuel cell system capable of detecting cross-leakage in the polymer electrolyte fuel cell.

BACKGROUND ART

One of the conventional configurations of fuel cell systems capable of detecting cross-leakage of electrolyte membrane is described in Patent Literature 1. In the fuel cell system described in Patent Literature 1, the pressure of anode gas during operation is set higher than the pressure of cathode gas to detect cross-leakage based on a drop in voltage in an activated overvoltage region. Such detection of cross-leakage is excellent to diagnose a fuel cell which is operating.

CITATION LIST

Patent Literature

Patent Literature 1: Japanese Patent Laid Open Publication No. 2003-45466

SUMMARY OF INVENTION

However, in the aforementioned fuel cell system described in Patent Literature 1, cross-leakage is detected by reaction between hydrogen cross-leaked from the anode to the cathode and oxygen present in the cathode. Accordingly, when the catalyst of the cathode is deteriorated, the reaction between the cross-leaked hydrogen and oxygen in the cathode becomes less likely to occur, thus making it difficult to accurately detect cross-leakage in some cases.

The present invention was made in the light of the aforementioned problem involved in the conventional art. An object thereof is to provide a fuel cell system capable of reliably diagnosing cross-leakage without depending on the catalytic activity in the electrode even when the catalyst is deteriorated.

A fuel cell system according to a first aspect of the present invention includes: a fuel cell stack including a plurality of single fuel cells stacked on each other, each single fuel cell being supplied with hydrogen gas and air to an anode electrode and a cathode electrode, respectively, to generate electricity;

a voltage applying device that applies voltage to the fuel cell stack after oxygen present in the cathode electrode is reduced; and a cross-leakage diagnosis device that diagnoses, based on voltage of the single fuel cells when the voltage applying device applies the voltage to the fuel cell stack, whether hydrogen gas in the anode electrode is cross-leaked to the cathode electrode in each single fuel cell.

A fuel cell system according to a second aspect of the present invention includes: a fuel cell stack including a plurality of single fuel cells stacked on each other, each single fuel cell being supplied with hydrogen gas and air to an anode electrode and a cathode electrode, respectively, to generate electricity; a voltage applying device that applies voltage to the fuel cell stack after it is determined that the voltage of the single fuel cells is equal to or lower than a predetermined referential value; and a cross-leakage diagnosis device that diagnoses, based on voltages of the single fuel cells when the voltage applying device applies the voltage to the fuel cell stack, whether hydrogen gas in the anode electrode is cross-leaked to the cathode electrode in each single fuel cell.

A method for diagnosing a fuel cell system according to a third aspect of the present invention includes the steps of: preparing a fuel cell stack including a plurality of single fuel cells stacked on each other, each single fuel cell being supplied with hydrogen gas and air to an anode electrode and a cathode electrode, respectively, to generate electricity; applying voltage to the fuel cell stack after reducing oxygen present in the cathode electrode; and diagnosing, based on voltages of the single fuel cells when the voltage applying device applies the voltage to the fuel cell stack, whether hydrogen gas in the anode electrode is cross-leaked to the cathode electrode in each single fuel cell.

BRIEF DESCRIPTION OF DRAWINGS

FIG. 1 is a schematic illustrating the configuration of a fuel cell system according to an embodiment of the present invention.

FIG. 2 is a cross-sectional view of a fuel cell stack of the fuel cell system.

FIG. 3 is a flowchart illustrating the sequence to diagnose cross-leakage in the fuel cell system.

FIGS. 4A to 4D are diagrams corresponding to the steps of the aforementioned flowchart.

FIG. 5 is a graph showing voltage of each single fuel cell when target stack voltage is applied to a fuel cell stack composed of plural single fuel cells.

DESCRIPTION OF EMBODIMENTS

Figure 1:
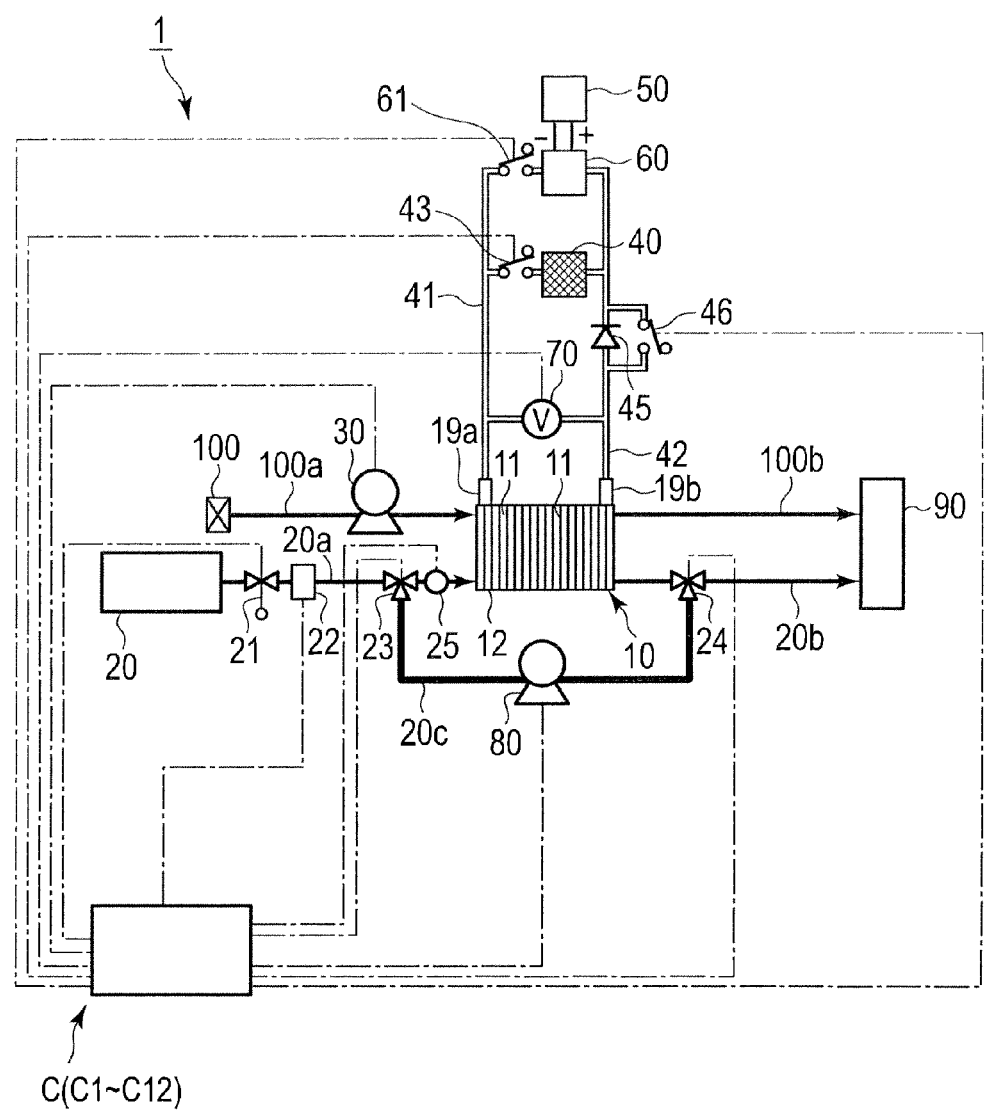
[FIG. 1]

Hereinafter, a description is given of a fuel cell system of the present invention in detail using the drawings. The dimensional proportions in the drawings are exaggerated for convenience of explanation and are therefore different from the actual ones in some cases.

A fuel cell system 1 according to an embodiment of the present invention includes a fuel cell stack 10 as a main hardware component. The fuel cell system 1 further includes a hydrogen tank 20, a pressure-reducing valve 21, a flow rate controller 22, three-way valves 23 and 24, and a pressure sensor 25 as hydrogen-system components. The fuel cell system 1 further includes an air filter 100 and a compressor 30 as air-system components. In addition, the fuel cell system 1 includes a load 40 such as a motor, a battery 50, a power manager 60, a voltage meter 70, a recycle compressor 80, a hydrogen consuming device 90, and the like and further includes a control unit C.

Figure 2:
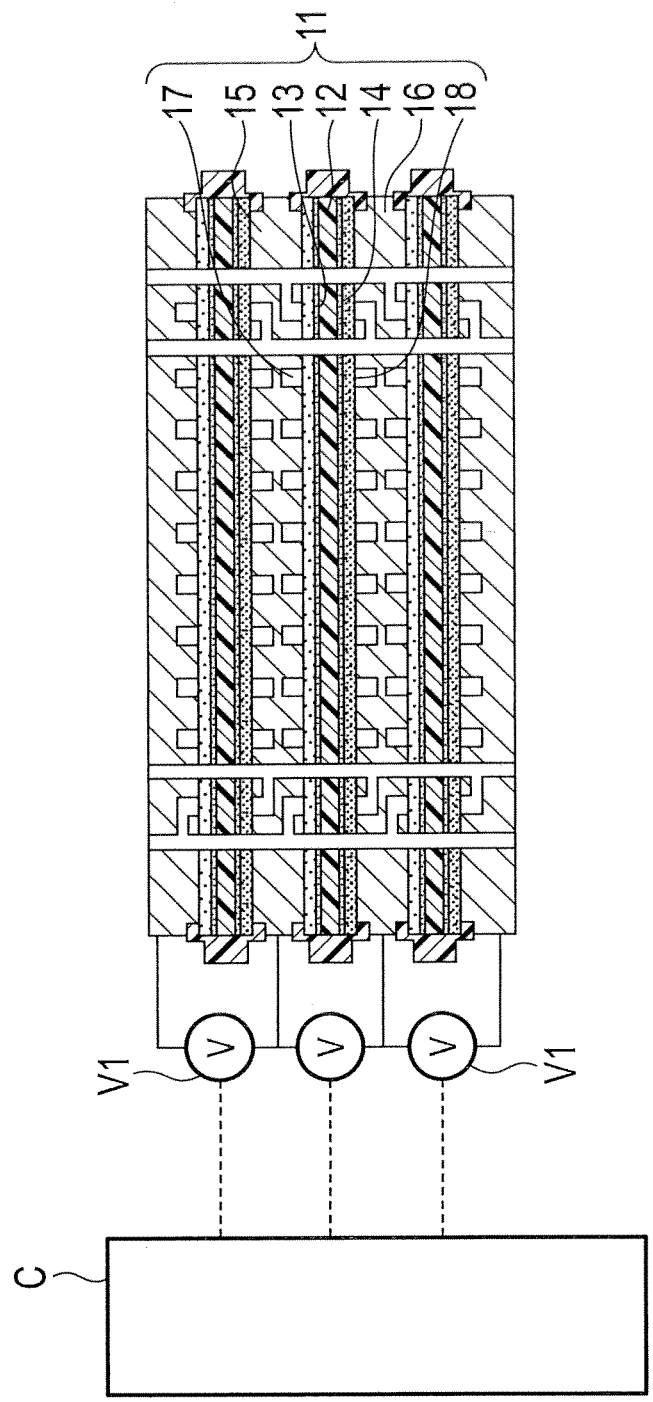
[FIG. 2]

The fuel cell stack 10 includes plural single fuel cells 11 stacked on each other. As shown in FIG. 2, each single fuel cell 11 includes a solid polymer electrolyte membrane 12 and further includes a cathode electrode 13 stacked on one surface of the solid polymer electrolyte membrane 12 and an anode 14 stacked on the other surface thereof. Moreover, a separator 15 is provided on the cathode electrode 13 with a required distance away from the same, and a separator 16 is provided on the anode electrode 14 with a required distance away from the same. Hereinafter, the solid polymer electrolyte membrane is referred to as just an electrolyte membrane, and the single fuel cells are just referred to as single cells.

The solid polymer electrolyte membrane 12 is composed of solid polymer ion-exchanging membrane of perfluorosulfonic acid polymer (for example, Nafion (Registered Trademark)) or the like, for example. Between the cathode electrode 13 and separator 15, a cathode gas channel 17 is formed. Between the anode electrode 14 and separator 16, an anode gas channel 18 is formed.

This embodiment is described using hydrogen gas as an example of the anode gas and air as an example of the cathode gas. However, the present invention is not limited to these gases.

As shown in FIG. 1, the both ends of the fuel cell stack 10 are sandwiched by an anode-side current collector 19a and a cathode-side current collector 19b. Electric power is supplied from the anode-side and cathode-side current collectors 19a and 19b to the load 40.

In each single fuel cell 11, protons generated by a catalytic reaction in the anode electrode 14 move through the electrolyte membrane 12 to reach the cathode electrode 13, in which the protons then electrochemically react with oxygen contained in the cathode gas to generate electricity.

In this embodiment, as shown in FIG. 2, the separators 15 and 16 of the single fuel cells 11 are connected to plural fuel cell voltage sensors V1 for detecting output voltage of each single cell 11. The fuel cell voltage sensors V1 are individually connected to the input side of the control unit C. The fuel cell voltage sensors V1 are not shown in FIG. 1.

In the example shown in the embodiment, the fuel cell voltage sensors V1 are attached to the respective single fuel cells 11 for the purpose of increasing the detection accuracy. However, the fuel cell voltage sensors V1 may be each attached to adjacent two of the single fuel cells 11 for example. Alternatively, the fuel cell voltage sensors V1 may be each attached to adjacent three of the single fuel cells 11. For case of explanation, FIG. 2 shows three of the fuel cell voltage sensors V1 attached to the respective single-cells 11.

In this embodiment, the connection style in which the fuel cell voltage sensors V1 are individually connected to each single fuel cell 11 and the connection style in which the fuel cell voltage sensors V1 is each connected to two or more single fuel cells are called group connection. A group of one single-cell or two or more single-cells in group connection is called a fuel cell group.

The hydrogen tank 20 stores a required amount of high-pressure hydrogen gas for supply to the fuel cell stack 10. As shown in FIG. 1, between the hydrogen tank 20 and a gas inlet (not shown) of the fuel cell stack 10, a gas supply pipe 20a is joined. The gas supply pipe 20a is provided with: the pressure-reducing valve 21 for reducing the pressure of hydrogen gas flowing through the gas supply pipe 20a; the flow rate controller 22 for increasing and decreasing the flow rate of hydrogen gas; the three-way valve 23; and the pressure sensor 25, which are arranged in this order from the upstream to the downstream side. The pressure-reducing valve 21 and flow rate controller 22 are connected to the output side of the control unit C to be driven. The pressure sensor 25 is connected to the input side of the control unit C.

The hydrogen consuming device 90 is connected to a gas outlet (not shown) of the fuel cell stack 10 through a gas exhaust pipe 20b. The hydrogen consuming device 90 includes a catalyst consuming hydrogen gas and the like. The hydrogen consuming device 90 is supplied with exhaust gas exhausted from the cathode electrodes 13 of the fuel cell stack 10 and uses the supplied exhaust gas to oxidize hydrogen gas, thereby exhausting gas not containing hydrogen gas out of the fuel cell system 1.

The gas exhaust pipe 20b is provided with the three-way valve 24. Between the three-way valve 24 and the three-way valve 23 of the gas supply pipe 20a, a gas circulation pipe 20c, through which the exhaust gas is returned for circulation, is provided. The three-way valves 23 and 24 are connected to the output side of the control unit C to be driven for switching the flow path.

The gas circulation pipe 20c is provided with the recycle compressor 80 for pressure-feeding the exhaust gas, which is exhausted to the gas exhaust pipe 20b, to the gas supply pipe 20a. The recycle compressor 80 is connected to the output side of the control unit C to be controlled. Specifically, part of hydrogen gas remaining unused in the fuel cell stack 10 is returned to the fuel cell stack 10 through the three-way valve 24, gas circulation pipe 20c, three-way valve 23, and gas supply pipe 20a by the recycle compressor 80 for circulation. In some cases, hydrogen gas exhausted from the fuel cell stack 10 is mixed with a lot of nitrogen gas in air transmitted through the electrolyte membranes 12 from the cathode electrodes 13. In such cases, the hydrogen gas exhausted from the fuel cell stack 10 is fed to the hydrogen consuming device 90 through the gas exhaust pipe 20b by the three-way valve 24.

The air filter 100 is to remove impurities contained in the atmosphere. Between the air filter 100 and the air inlet (not shown) of the fuel cell stack 10, a cathode gas supply pipe 100a is connected.

The cathode gas supply pipe 100a is provided with the compressor 30 for pressure-feeding the air taken through the air titter 100 to the fuel cell stack 10. The compressor 30 is connected to the output side of the control unit C to be controlled. Moreover, the air outlet (not shown) of the fuel cell stack 10 is connected to the hydrogen consuming device 90 through a cathode gas exhaust pipe 100b.

Moreover, the fuel cell stack 10 is connected to wires 41 and 42 through the anode- and cathode-side current collectors 19a and 19h, respectively. The wires 41 and 42 are connected to the load 40, battery 50, power manager 60, and voltage meter 70.

The battery 50 is a secondary battery capable of storing part of electricity generated by the fuel cell stack 10 (surplus electricity). The battery 50 is connected to the power manager 60 which increases and decreases the voltage of the battery 50. The power manager 60 is connected/disconnected from the wires 41 and 42 through an on/off switch 61. Furthermore, the load 40 is connected/disconnected from the wires 41 and 42 through an on/off switch 43.

The wire 42 is provided with a reverse-current prevention diode 45 to prevent reverse current, and the reverse-current prevention diode 45 is connected to the on/off switch 46 in parallel. In this configuration, current can also flow in the opposite direction. These on/off switches 43, 46, and 61 are connected to the output side of the control unit C and are capable of properly switches connection and disconnection.

The voltage meter 70 is connected to between the wires 41 and 42 and is configured to detect voltage applied by the battery 50 or power-generating voltage of the fuel cell stack 10. The voltage meter 70 is also connected to the input side of the control unit C.

The control unit C includes: a controller composed of a CPU (central processing unit), an interface circuit, and the like; and a storage unit composed of a hard disk, a semiconductor memory, or the like (not shown). The control unit C executes programs that are stored in the storage and used in the fuel cell system to exert the following functions (1) to (12).

(1) A Function of Increasing and Decreasing Supply Pressure of Anode Gas Supplied to the Fuel Cell Stack 10

The device exerting this function is referred to as a hydrogen gas pressure increasing/decreasing device C1. In this embodiment, the control unit C increases or decreases the supply pressure of the anode gas through the pressure-reducing valve 21. Specifically, the control unit C sets the pressure of the anode gas higher than the atmospheric pressure for pressure feeding based on the pressure detected by the pressure sensor 25.

(2) A Function of Increasing and Decreasing Supply Pressure of the Cathode Gas Supplied to the Fuel Cell Stack 10

The device exerting this function is referred to as an air pressure increasing/decreasing device C2. In this embodiment, the control unit C increases or decreases the supply pressure of the cathode gas through the compressor 30.

(3) A Function of Stopping Only Supply of the Cathode Gas Among the Anode Gas and Cathode Gas Respectively Supplied to the Anode and Cathode Electrodes 14 and 13 of Each Single Fuel Cell 11

The device exerting this function is referred to as an air supply shut-off device C3. By causing the anode gas and the cathode gas to simultaneously flow through the anode and cathode electrodes 14 and 13 in each single fuel cell 11, the single fuel cell 11 can generate electricity. In this embodiment, the control unit C stops the compressor 30 to stop supply of the cathode gas.

(4) A Function of Detecting Voltage of Each Single Fuel Cell 11 or Voltage of Two or More Single Fuel Cells 11 in Group Connection Through the Fuel Cell Voltage Sensors V1

The device exerting this function is referred to as a fuel cell group voltage detection device C4. In this embodiment, as described above, the control unit C detects voltage of each single fuel cell 11 through the fuel cell voltage sensors V1, which are provided for the respective single fuel cell 11.

(5) A Function of Determining Whether or not the Voltage of Each Fuel Cell Group is Equal to or Lower than a Second Referential Value after the Supply of Cathode Gas is Stopped The device exerting this function is referred to as a second fuel-cell-voltage judgment device C5. In this embodiment, the control unit C connected to the fuel cell voltage sensors V1 determines whether or not the voltage of each fuel cell group is equal to or lower than the second referential value. The second referential value in this embodiment is set to such a value that if the voltage of each fuel cell group is equal to or lower than the second referential value when the fuel cell stack 10 is connected to the load 40, it is thought that the cathode includes very little oxygen.

(6) A Function of Disconnecting the Load 40 from the Fuel Cell Stack 10 if it is Determined that the Voltage of Each Fuel Cell Group is Equal to or Lower than the Second Referential Value The device exerting this function is referred to as a load disconnecting device C6. In this embodiment, the control unit C turns off the on/off switch 43 to disconnect the load 40 from the fuel cell stack 10.

(7) A Function of Determining Whether or not the Voltage of Each Fuel Cell Group is Equal to or Lower than a Third Referential Value The device exerting this function is referred to as a third fuel-cell-voltage judgment device C7. In this embodiment, the control unit C connected to the fuel cell voltage sensors V1 determines whether or not the voltage of each fuel cell group is equal to or lower than the third referential value. The third referential value shown in this embodiment is set to such a value that if the voltage of each fuel cell group is equal to or lower than the third referential value in a state where the load 40 is disconnected from the fuel cell stack 10, the cathode is thought to be in nitrogen atmosphere. Herein, the third referential value is higher than the second referential value.

(8) A Function of Connecting the Battery 50 to the Fuel Cell Stack 10 if it is Determined that the Voltage of Each Fuel Cell Group is Equal to or Lower than the Third Referential Value The function exerting this function is referred to as a battery connecting device C8. Specifically, the control unit C turns on the on/off switches 46 and 61 to connect the battery 50 to the fuel cell stack 10.

(9) A Function of Applying Voltage to the Fuel Cell Stack 10 after Reducing Oxygen Present in the Cathode 13

The device exerting this function is referred to as a voltage applying device C9. Specifically, the control unit C applies stack voltage to the fuel cell stack 10 if it is determined that the voltage of each fuel cell group is equal to or lower than the third referential value. Moreover, the control unit C increases the stack voltage to a predetermined voltage with time through the power manager 60. The gradient of voltage is set in consideration of sampling intervals of voltage values of the fuel cell groups.

(10) A Function of Determining Whether or not Voltages of all the Fuel Cell Groups are Equal to or Lower than a Fourth Referential Value The device exerting this function is referred to as a fourth fuel-cell-voltage judgment device C10. In this embodiment, the control unit C connected to the fuel cell voltage sensors V1 determines whether or not the voltages of all the fuel cell group are equal to or lower than a fourth referential value. The fourth referential value in this embodiment is set so as to satisfy the following condition: if the voltage of a fuel cell group is equal to or lower than the fourth referential value in a state where the stack voltage is applied to the fuel cell stack 10 with the load 40 disconnected therefrom, no oxygen remains in the cathode electrode thereof.

(11) A Function of Determining Whether or not the Stack Voltage is Equal to or Higher than a Predetermined Stack Voltage Value if it is Determined that the Voltages of all the Fuel Cell Groups are Equal to or Lower than the Fourth Referential Value The device exerting this function is referred to as a stack voltage judgment device C11. The predetermined stack voltage value is a value corresponding to the voltage of all the fuel cell groups.

(12) A Function of Diagnosing, Based on the Voltage of Each Single Fuel Cell Obtained when the Voltage Applying Device Applies Voltage to the Fuel Cell Stack, Whether Hydrogen Gas of the Anode Electrode is Cross-Leaked to the Cathode Electrode in Each Single Fuel Cell The device exerting this function is referred to as a cross-leakage diagnosis device C12. In this embodiment, based on the detected voltage of each single fuel cell 11, the control unit C connected to the fuel cell voltage sensors V1 diagnoses cross-leakage of the individual single fuel cells. Specifically, if the voltage of the single fuel cell measured by a certain one of the fuel cell voltage sensors V1 is lower than a first referential value, the control unit C diagnoses that hydrogen gas in the anode is cross-leaked into the cathode electrode in the single fuel cell of interest. The first referential value is a threshold value of voltage of a single fuel cell corresponding to a single cell with perforated electrolyte membrane. If the detected voltage of a single fuel cell is lower than the threshold value, the single fuel cell of interest is diagnosed as having cross-leakage.

Figure 3:
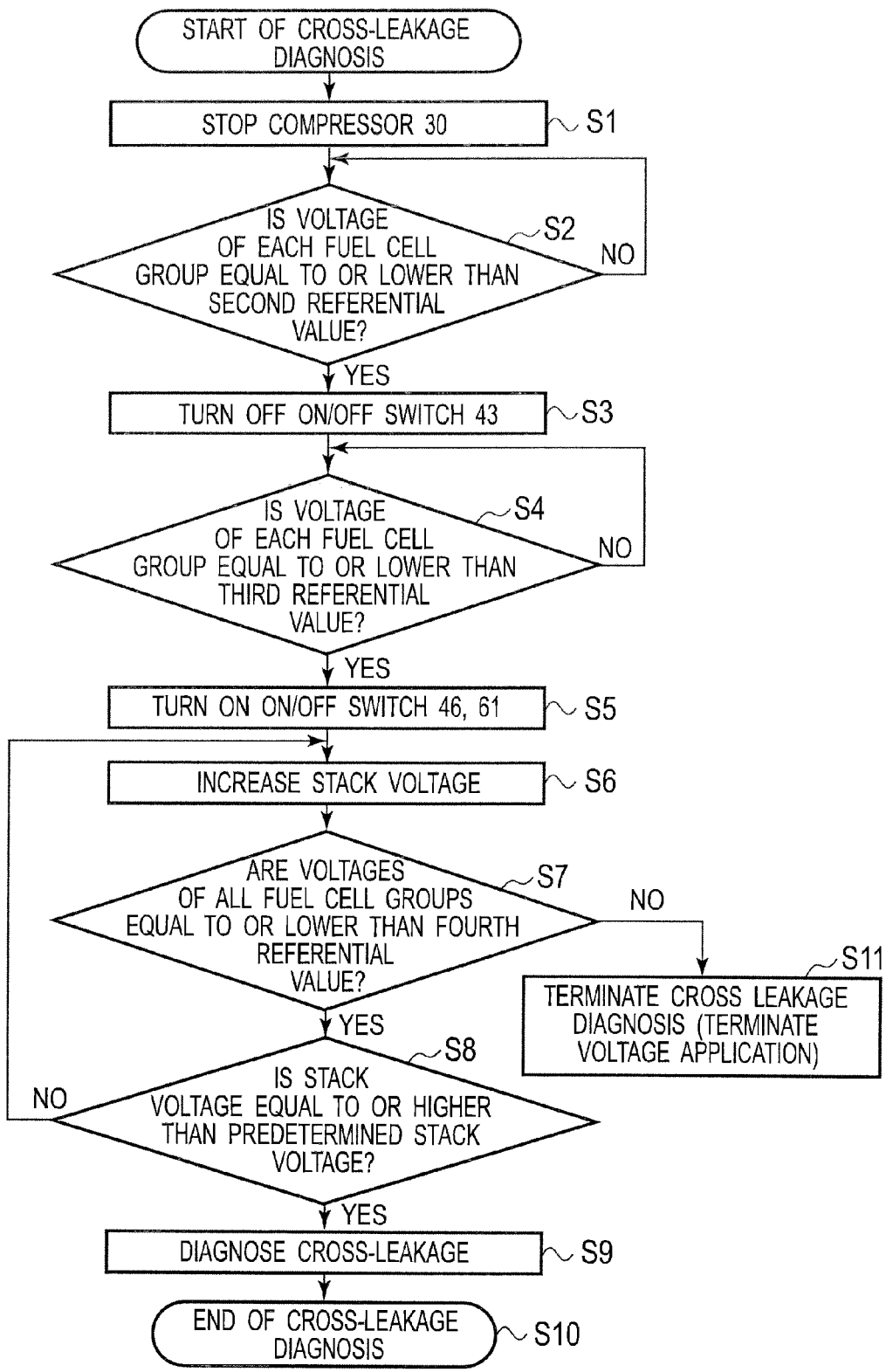
[FIG. 3]
Figure 4:
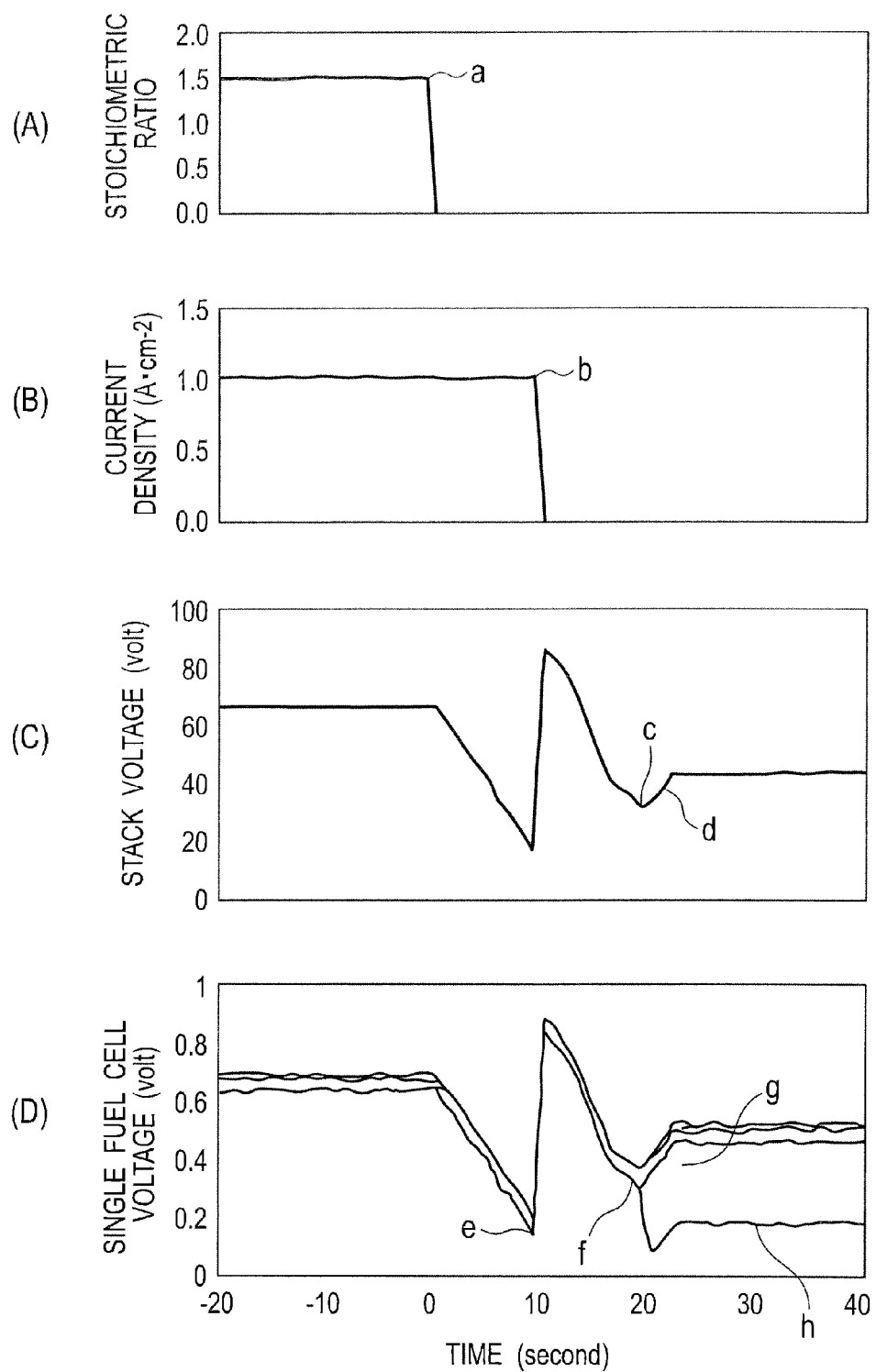
[FIG. 4]

With reference to FIG. 3 and FIGS. 4A to 4D, a description is given of the operation of the fuel cell system 1 having the aforementioned configuration. FIG. 3 is a flowchart illustrating the sequence to diagnose cross-leakage in the fuel cell system 1. FIGS. 4A to 4D are time charts corresponding to the steps of the flowchart. Concretely, FIG. 4A shows the relationship between the stoichiometric ratio and time. FIG. 4B shows the relationship between the current density of the fuel cell stack and time. FIG. 4C shows the relationship between the stack voltage and time. FIG. 4D shows voltage of the single fuel cells and time.

When the fuel cell system 1 is operating, the on/off switch 43 is on, and the on/off switches 46 and 61 are both off. In other words, the load 40 is driven by the fuel cell stack 10, and the battery 50 is not electrically connected. At this time, the compressor 30 and recycle compressor 80 are both operating. The operation pressures of the hydrogen gas and air are both 150 kPa.

If detecting a signal to stop the fuel cell system 1, the control unit C proceeds to the cross-leakage diagnosis process.

[Step S1]

The compressor 30 is stopped, and the control unit C proceeds to step S2. When the load 40 is connected to the fuel cell stack 10, electric current is extracted from the single fuel cells generating electricity, and the voltages generated at the single fuel cells are detected by the fuel cell voltage sensors V1. However, if the compressor 30 is stopped to stop supply of air as indicated by reference character a of FIG. 4A, because of consumption of oxygen in the cathode electrode, the output voltage is reduced, and the voltage of each single fuel cell is reduced as shown in FIGS. 4C and 4D.

[Step S2]

It is determined whether or not the voltage detected by the fuel cell voltage sensors V1 is equal to or lower than the second reference value (for example, 0.2 V). If it is determined that the voltage detected by the fuel cell voltage sensors V1 is equal to or lower than the second reference value, the control unit C proceeds to step S3, and otherwise, the control unit C repeats step S2. Specifically, the single-cells have a drop in voltage due to the stop of air supply, and if it is determined that the voltage detected by the fuel cell voltage sensors V1 is equal to or lower than the second reference value as indicated by reference character e in FIG. 4D, the control unit C proceeds to step S3. If it is determined that the voltage detected by the fuel cell voltage sensors V1 is higher than the second reference value, the control unit C repeats step S2. In this embodiment, the above determination is made based on the maximum value of voltages of the plural single fuel cells. However, the present invention is not limited to this, the determination may be made based on the minimum or average value of voltages of the single fuel cells detected by the plural fuel cell voltage sensors V1.

[Step S3]

If the maximum value of the voltages of the single fuel cells detected by the fuel cell voltage sensors V1 is lower than the second referential value, the on/off switch 43 is turned off to disconnect the load 40 from the fuel cell stack 10. In this case, as indicated by reference character b of FIG. 4B, the current density of the fuel cell stack 10 is reduced to 0 Acm$^{-2}$.

Since current is extracted before the load 40 is disconnected from the fuel cell stack 10, most oxygen in the cathode electrode is consumed. However, a very little oxygen remains actually. If the load 40 is disconnected from the fuel cell stack 10, therefore, the voltage of the single fuel cells once increases because of the difference in potential between the anode and cathode electrodes as shown in FIGS. 4C and 4D. Thereafter, oxygen remaining in the cathode electrode reacts with the hydrogen transmitted from the anode electrode through the electrolyte membranes 12 and consumed, and the voltage of single fuel cells gradually falls.

[Step S4]

It is determined whether or not the voltage of the single fuel cells detected through the fuel cell voltage sensors V1 is lower than the third referential value (0.6 V, for example) in a state where the load 40 is disconnected. Specifically, it is determined whether or not the voltage of the single fuel cells once increased is reduced to less than 0.6 V as the third referential value as indicated by reference character f in FIG. 4D. In this step, similarly to step S2, the determination may be made using the maximum, minimum, or average value of voltages of the single fuel cells detected by the plural fuel cell voltage sensors V1. However, in this embodiment, in order to consume oxygen more reliably, the control unit C proceeds to step S5 when the maximum value of the voltages detected by the fuel cell voltage sensors V1 is lower than the third referential value.

[Step S5]

The control unit C turns on the on/off switches 46 and 61 and proceeds to step S6.

[Step S6]

Gradually increasing voltage is applied to the fuel cell stack 10 through the power manager 60 (see referential symbol c in FIG. 4C). The reason for gradually increasing the applied voltage is to prevent large voltage from being accidentally applied to individual single fuel cells.

[Step S7]

It is determined whether or not the voltages detected through all the fuel cell voltage sensors V1 are equal to or lower than the fourth referential value (1.0 V, for example). If it is determined that the voltages detected through all the fuel cell voltage sensors V1 are equal to or lower than the fourth referential value, the control unit C proceeds to step S8. However, if it is determined that the voltages detected through all the fuel cell voltage sensors V1 are higher than the fourth referential value, the control unit C proceeds to step S11 and terminates the cross-leakage diagnosis process. Specifically, as indicated by reference character g in FIG. 4D, it is determined whether or not all the voltages of the single fuel cells detected by the fuel cell voltage sensors V1 are equal to or lower than 1.0 V as the fourth referential value. If any voltage of the single fuel cells 11 is higher than the fourth referential value, it is understood that oxygen remains in the cathode electrode of the single fuel cell 11 having a voltage higher than the fourth referential value. If the voltage continues to be applied to the fuel cell stack 10, corrosion reaction of the catalyst layers of the cathode electrodes, that is oxidation of carbon as a conductive carrier constituting the catalyst proceeds.

[Step S8]

It is determined whether the voltage of the fuel cell stack 10 has reached a target stack voltage. If it is determined that the voltage of the fuel cell stack 10 has reached the target stack voltage, the control unit C proceeds to step S9 and otherwise returns to step S6 to further increase the applied voltage. In other words, as indicated by reference character d in FIG. 4C, the voltage applied to the fuel cell stack 10 is increased at a certain gradient in the steps S6 to S8.

Herein, the applied target stack voltage is set to such a value that average voltage of the single fuel cells which is obtained by dividing the stack voltage by the number of single fuel cells is equal to or higher than 0.2 V. This is because the diagnosis of cross-leakage needs to cause hydrogen oxidization in the oxidant electrode as shown in later-described Formula 1. Generally, it is therefore necessary to apply a voltage of 0.2 V or higher per single fuel cell depending on the conditions. In this embodiment, a voltage of 0.5 V per single fuel cell is applied.

[Step S9]

After the target stack voltage is applied, the cross-leakage diagnosis is performed. At this time, if it is determined that the voltage of the single fuel cell detected through any fuel cell voltage sensor V1 is equal to or lower than the first reference value, it is diagnosed that the single fuel cell having the voltage equal to or lower than the first reference value is likely to have cross-leakage. In other words, it is diagnosed that the electrolyte membrane of the same is likely to be damaged and leak the anode gas (fuel gas) to the cathode electrode (oxidant electrode). The first referential value can be set to 0.3 V, for example.

[Step S10]

The cross-leakage diagnosis is terminated.

Figure 5:
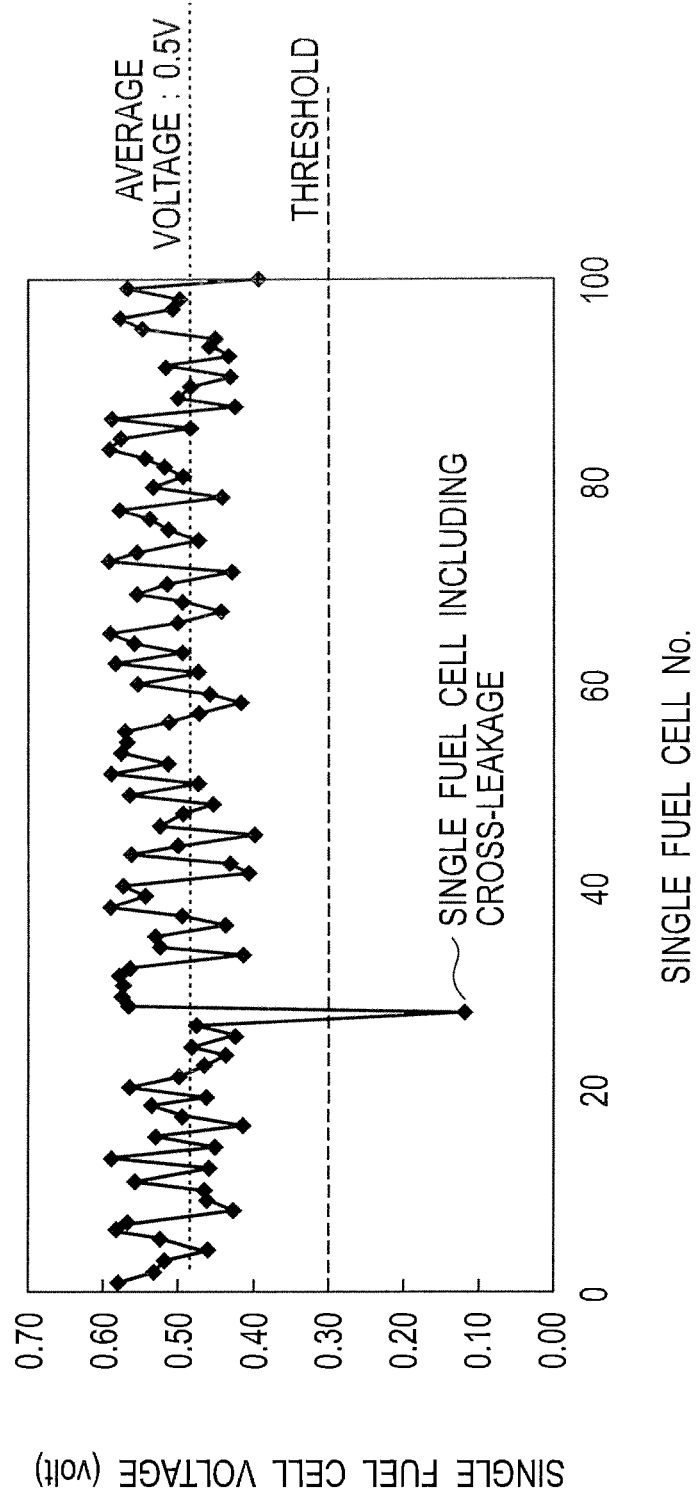
[FIG. 5]

FIG. 5 is a graph illustrating the voltage of individual single fuel cells when target stack voltage is applied to the fuel cell stack composed of plural single fuel cells stacked. Specifically, first one hundred single fuel cells 11 are numbered and stacked to form the fuel cell stack 10. Then a stack voltage of 50 V is applied to the fuel cell stack 10, and voltages of the single fuel cells 11 are measured by the fuel cell voltage sensors V1. FIG. 5 shows voltages of the individual single fuel cells 11 in this process. As apparent from FIG. 5, one of the single fuel cells 11 has a voltage of not higher than 0.3. This single fuel cell 11 is determined to have cross-leakage. The amount of cross-leakage can be calculated from the voltage of the single fuel cell with reference to a pickup table mapping the voltage of single fuel cells and the amount of cross-leakage. The pickup table may be stored in a storage unit of the control unit C.

Herein, an additional description is given of the mechanism to determine that the single fuel cell 11 having low voltage includes cross-leakage. In steps S1 to S4, oxygen present in the cathode electrode (oxidant electrode) is consumed and reduced to form a nitrogen atmosphere in the cathode electrode. When the cathode electrode is surely in the nitrogen atmosphere, the fuel cell voltage sensor V1 thereof is equal to or lower than the third referential value. Accordingly, voltage can be applied to the fuel cell stack 10 from the battery 50 in that state. At this time, in all the stacked single fuel cells 11, oxidation reaction of hydrogen transmitted through the electrolyte membranes 12 occurs as shown in Formula 1.

$$\text{Oxidant electrode: } H_2 \rightarrow 2H^+ + 2e^- \quad \text{[Formula 1]}$$

The above reaction occurs in all the single fuel cells 11 stacked on each other. Moreover, since the single fuel cells 11 are stacked on each other, the current value and reaction speed are the same throughout all the single fuel cells 11. However, in the presence of cross-leakage, hydrogen increases in the cathode electrode and reacts at a smaller overvoltage. The voltage of the single fuel cell 11 having cross-leakage is therefore reduced.

According to the fuel cell system of the embodiment of the present invention, the following effects can be provided.

(1) It is possible to surely diagnose cross-leakage without depending on the catalytic activity even if the catalyst is deteriorated.

(2) In the electricity generating state in which the anode gas and cathode gas are supplied and electric current is extracted, the supply of the cathode gas is stopped at first before the system is stopped, and electric current is extracted. It is therefore possible to quickly and sufficiently consume oxygen remaining in the cathode electrodes.

(3) After the supply of cathode gas is stopped, the extraction of current from the fuel cell is stopped when the voltage of the single fuel cells is reduced to lower than the second referential value. In other words, in the case where the voltage of the single fuel cells constituting the fuel cell stack is higher than the second reference value, the cathode electrodes thereof are more likely to include a lot of oxygen. Accordingly, if voltage is applied to the fuel cell at this time, carbon could deteriorate. In this embodiment, the extraction of current is stopped when the voltage of the single fuel cells is reduced to lower than the second referential value, thus preventing deterioration of carbon.

(4) A predetermined stack voltage is applied to the fuel cell stack through the battery when the voltage of a certain fuel cell group falls below the third reference value. Herein, the voltage of the fuel cell group below the third reference value in a state where current is not extracted means that the cathode electrode thereof is in a nitrogen atmosphere. If the predetermined stack voltage is applied in this state, the voltage of the single fuel cell having cross leakage falls while the voltage of the single fuel cell not having cross leakage increases. In such a manner, it is possible to detect cross-leakage without deteriorating the single fuel cells.

(5) In the process of applying the predetermined stack voltage, detecting a fuel cell group having a voltage of higher than the fourth referential value means that oxygen remains in the cathode electrode thereof. This can cause corrosion of the cathode electrode or dissolution of the catalyst. In such a case, the application of voltage is stopped to prevent corrosion of the cathode electrode and dissolution of the catalyst.

(6) The predetermined stack voltage is applied at a predetermined voltage gradient. Accordingly, the voltage of each single fuel cell changes slowly, thus allowing determination whether the voltage of the single fuel cells exceeds the predetermined voltage. Moreover, charging current flows to an electric double layer. Accordingly, even if oxygen remains in the cathode electrode, the deterioration of the cathode electrode can be prevented for the current flowing to the electric double layer.

(7) The anode gas is fed at a pressure higher than the atmospheric pressure by the hydrogen gas pressure increasing/decreasing device that increases or decreases the supply pressure of the anode gas supplied to the fuel cell stack. Accordingly, the pressure of the anode gas is made higher than the atmospheric pressure. This can increase the amount of cross-leakage, thus significantly shortening the time taken to detect cross-leakage.

(8) The degree of deterioration of the electrolyte membrane can be determined by calculating the amount of cross-leakage in each single fuel cell. It is therefore possible to change single fuel cells before the electrolyte membrane is perforated or operate the system 1 so as not to increase the amount of cross-leakage, for example.

The present invention is not limited to the aforementioned embodiment and can be modified as follows. To be specific, in the description of the aforementioned embodiment, the fuel cell voltage sensors are connected to the respective fuel cell signal cells as an example. However, as for some of the plural single fuel cells located in a stack range which is subject to cross-leakage, the fuel cell voltage sensors are connected to the respective single fuel cells. As for the single fuel cell arranged in the other stack range, each fuel cell voltage sensor is connected to two or more of the single fuel cells. In this case, it is possible to further reduce the cost while keeping the accuracy in calculating the amount of cross leakage.

In the above embodiment, oxygen present in the cathode electrode is reduced by consuming the oxygen existing in the cathode electrode. However, instead of consuming oxygen, oxygen may be reduced by injecting inert gas such as nitrogen gas, for example.

The entire contents of Japanese Patent Applications No. 2010-238240 (filed on Oct. 25, 2010) and No. 2011-190503 (filed on Sep. 1, 2011) are incorporated herein by reference.

Hereinabove, the contents of the present invention are described along the embodiment. However, it is obvious for those skilled in the art that the present invention is not limited to the above description and can be variously changed and modified.

Industrial Applicability

According to the present invention, it is possible to reliably diagnose cross-leakage without depending on the catalytic activity even if the catalyst is deteriorated.

Reference Signs List

1 FUEL CELL SYSTEM
10 FUEL CELL STACK
11 SINGLE FUEL CELL
13 CATHODE ELECTRODE
14 ANODE ELECTRODE
40 LOAD
C CONTROL UNIT
C1 HYDROGEN GAS PRESSURE INCREASING/DECREASING DEVICE (HYDROGEN GAS PRESSURE INCREASING/DECREASING MEANS)
C2 AIR PRESSURE INCREASING/DECREASING DEVICE (AIR PRESSURE INCREASING/DECREASING MEANS)
C3 AIR SUPPLY SHUTOFF DEVICE (AIR SUPPLY SHUTOFF MEANS)
C4 FUEL-CELL-GROUP-VOLTAGE DETECTION DEVICE (FUEL-CELL-GROUP-VOLTAGE DETECTION MEANS)
C5 SECOND FUEL-CELL-VOLTAGE JUDGMENT DEVICE (SECOND FUEL-CELL-VOLTAGE JUDGMENT MEANS)
C6 LOAD DISCONNECTING DEVICE (LOAD DISCONNECTING MEANS)
C7 THIRD FUEL-CELL-VOLTAGE JUDGMENT DEVICE (THIRD FUEL-CELL-VOLTAGE JUDGMENT MEANS)
C8 BATTERY CONNECTING DEVICE (BATTERY CONNECTING MEANS)
C9 VOLTAGE APPLYING DEVICE (VOLTAGE APPLYING MEANS)
C10 FOURTH FUEL-CELL-VOLTAGE JUDGMENT DEVICE (FOURTH FUEL-CELL-VOLTAGE JUDGMENT MEANS)
C11 STACK VOLTAGE JUDGMENT DEVICE (STACK VOLTAGE JUDGMENT MEANS)
C12 CROSS-LEAKAGE DIAGNOSIS DEVICE (CROSS-LEAKAGE DIAGNOSIS MEANS)
V1 FUEL CELL VOLTAGE SENSOR

The invention claimed is:

1. A fuel cell system, comprising:
a fuel cell stack including a plurality of single fuel cells stacked on each other, each single fuel cell being supplied with hydrogen gas and air to an anode electrode and a cathode electrode, respectively, to generate electricity;
a voltage applying device that applies voltage to the fuel cell stack without extracting current from the fuel cell stack, after oxygen present in the cathode electrode is reduced;
a stack voltage judgment device that determines, when the voltage applying device applies the voltage to the fuel cell stack, whether or not the voltage of the fuel cell stack is higher than a target voltage; and
a cross-leakage diagnosis device that diagnoses, based on voltage of the single fuel cells when the voltage applying device applies the voltage to the fuel cell stack, whether hydrogen gas in the anode electrode is cross-leaked to the cathode electrode in each single fuel cell, wherein
the voltage of the fuel cell stack is lower than the target voltage when the voltage applying device starts applying the voltage to the fuel cell stack,
the voltage applying device increases the voltage of the fuel cell stack before the stack voltage judgment device determines that the voltage of the fuel cell stack is higher than the target voltage, and
if the stack voltage judgment device determines that the voltage of the fuel cell stack is higher than the target voltage, the cross-leakage diagnosis device diagnoses cross-leakage of each single fuel cell.

2. The fuel cell system according to claim 1, wherein the cross-leakage diagnosis device diagnoses the single fuel cell having a voltage equal to or lower than a first referential value when the voltage is applied to the fuel cell stack as including cross-leakage.

3. The fuel cell system according to claim 1, further comprising:
an air supply shutoff device that stops the supply of air to the cathode electrode of each single fuel cell in a state where the fuel cell stack is generating electricity; and
a second fuel-cell-voltage judgment device that determines, after the air supply shutoff device stops the supply of air, whether or not the voltage of the single fuel cells is equal to or lower than a second referential value, wherein
if the second fuel-cell-voltage judgment device determines that the voltage of the single fuel cells is equal to or lower than the second referential value, the voltage applying device applies voltage to the fuel cell stack.

4. The fuel cell system according to claim 3, further comprising:
a load disconnecting device that disconnects a load from the fuel cell stack if the second fuel-cell-voltage judgment device determines that the voltage of the single fuel cells is equal to or lower than the second referential value; and
a third fuel-cell-voltage judgment device that determines, after the load disconnecting device disconnects the load from the fuel cell stack, whether or not the voltage of the single fuel cells is equal to or lower than a third referential value, wherein
if the third fuel-cell-voltage judgment device determines that the voltage of the single fuel cells is equal to or lower than the third referential value, the voltage applying device applies a voltage to the fuel cell stack.

5. The fuel cell system according to claim 1, further comprising:
a fourth fuel-cell-voltage judgment device that determines, when the voltage applying device applies the voltage to the fuel cell stack, whether or not the voltages of all the single fuel cells are equal to or lower than a fourth referential value, wherein
if the fourth fuel-cell-voltage judgment device does not determine that the voltages of all the single fuel cells are equal to or lower than the fourth referential value, the voltage applying device stops applying the voltage to the fuel cell stack.

6. The fuel cell system according to claim 1, wherein the voltage applying device increases the voltage applied to the fuel cell stack to a predetermined voltage value with time.

7. The fuel cell system according to claim 1, further comprising:
a hydrogen gas pressure increasing/decreasing device that increases or decreases supply pressure of hydrogen gas supplied to the anode electrode of each single fuel cell, wherein
the hydrogen gas pressure increasing/decreasing device feeds the hydrogen gas at a pressure higher than atmospheric pressure.

8. A fuel cell system, comprising:
a fuel cell stack including a plurality of single fuel cells stacked on each other, each single fuel cell being supplied with hydrogen gas and air to an anode electrode and a cathode electrode, respectively, to generate electricity;
a voltage applying device that applies voltage to the fuel cell stack without extracting current from the fuel cell stack, after oxygen present in the cathode electrode is reduced and it is determined that the voltage of the single fuel cells is lower than a predetermined referential value;
a stack voltage judgment device that determines, when the voltage applying device applies the voltage to the fuel cell stack, whether or not the voltage of the fuel cell stack is higher than a target voltage; and
a cross-leakage diagnosis device that diagnoses, based on voltages of the single fuel cells when the voltage applying device applies the voltage to the fuel cell stack, whether hydrogen gas in the anode electrode is cross-leaked to the cathode electrode in each single fuel cell, wherein
the voltage of the fuel cell stack is lower than the target voltage when the voltage applying device starts applying the voltage to the fuel cell stack,
the voltage applying device increases the voltage of the fuel cell stack before the stack voltage judgment device determines that the voltage of the fuel cell stack is higher than the target voltage, and
if the stack voltage judgment device determines that the voltage of the fuel cell stack is higher than the target voltage, the cross-leakage diagnosis device diagnoses cross-leakage of each single fuel cell.

9. A method for diagnosing a fuel cell system, comprising the steps of:
preparing a fuel cell stack including a plurality of single fuel cells stacked on each other, each single fuel cell being supplied with hydrogen gas and air to an anode electrode and a cathode electrode, respectively, to generate electricity;
applying voltage to the fuel cell stack without extracting current from the fuel cell stack, after reducing oxygen present in the cathode electrode, with a voltage applying device;
determining, when the voltage applying device applies the voltage to the fuel cell stack, whether the voltage of the fuel cell stack is higher than a target voltage; and
diagnosing, based on voltages of the single fuel cells when the voltage applying device applies the voltage to the fuel cell stack, whether hydrogen gas in the anode electrode is cross-leaked to the cathode electrode in each single fuel cell, after determining that the voltage of the fuel cell stack is higher than the target voltage, wherein
the voltage of the fuel cell stack is lower than the target voltage at the start of applying the voltage to the fuel cell stack, and
the voltage of the fuel cell stack increases before it is determined that the voltage of the fuel cell stack is higher than the target voltage.

10. The fuel cell system according to claim 1, wherein when the voltage is applied to the fuel cell stack by the voltage applying device, the cathode electrode is in a nitrogen atmosphere.

11. The fuel cell system according to claim 8, wherein when the voltage is applied to the fuel cell stack by the voltage applying device, the cathode electrode is in a nitrogen atmosphere.

12. The method according to claim 9, wherein when the voltage is applied to the fuel cell stack by the voltage applying device, the cathode electrode is in a nitrogen atmosphere.

* * * * *